United States Patent
Friedman et al.

(10) Patent No.: US 7,937,316 B2
(45) Date of Patent: May 3, 2011

(54) MULTI-BASKET STRUCTURE FOR EXCHANGE TRADED FUND (ETF)

(75) Inventors: Gregory A. Friedman, San Mateo, CA (US); Tony E. Kelly, Walnut Creek, CA (US); Joanna M. Callinicos, San Francisco, CA (US)

(73) Assignee: BlackRock Institutional Trust Company, N.A., San Francisco, CA (US)

( * ) Notice: Subject to any disclaimer, the term of this patent is extended or adjusted under 35 U.S.C. 154(b) by 61 days.

(21) Appl. No.: 12/168,036

(22) Filed: Jul. 3, 2008

(65) Prior Publication Data

US 2009/0063366 A1 Mar. 5, 2009

Related U.S. Application Data

(60) Provisional application No. 60/947,722, filed on Jul. 3, 2007.

(51) Int. Cl.
*G06Q 40/00* (2006.01)
(52) U.S. Cl. .......................................................... 705/37
(58) Field of Classification Search ...................... 705/37
See application file for complete search history.

(56) References Cited

U.S. PATENT DOCUMENTS

| | | | | |
|---|---|---|---|---|
| 7,099,838 B1 * | 8/2006 | Gastineau et al. | | 705/35 |
| 7,571,130 B2 * | 8/2009 | Weber et al. | | 705/36 R |
| 7,574,399 B2 * | 8/2009 | Weber et al. | | 705/37 |
| 2001/0025266 A1 * | 9/2001 | Gastineau et al. | | 705/36 |
| 2003/0144947 A1 * | 7/2003 | Payne | | 705/37 |
| 2003/0233302 A1 * | 12/2003 | Weber et al. | | 705/36 |
| 2007/0027790 A1 * | 2/2007 | Gastineau et al. | | 705/36 R |
| 2008/0040258 A1 * | 2/2008 | Weber et al. | | 705/37 |
| 2009/0313178 A1 * | 12/2009 | Weber et al. | | 705/36 R |

* cited by examiner

*Primary Examiner* — Lindsay M. Maguire
(74) *Attorney, Agent, or Firm* — Fenwick & West LLP (57) ABSTRACT

A exchange-traded fund (ETF) has a multi-basket structure that allows shares of the ETF to be created using a different basket of assets than the basket of assets required to redeem shares of the ETF. A method for administering a multi-basket ETF comprises providing shares of the ETF to investors in exchange for assets defined in a published creation basket, providing assets defined in a published redemption basket to investors in exchange for shares of the ETF, and publishing a holdings basket that represents the assets held in the ETF. The multi-basket ETF can be used to implement an ETF holding assets that have a relatively low liquidity and/or accessibility. The multi-basket structure also enables financial strategies such as to minimize transaction costs, increase tax efficiency, access less liquid or less accessible markets or securities, and meet regulatory requirements and ETF investment objectives.

21 Claims, 3 Drawing Sheets

MULTI-BASKET STRUCTURE FOR EXCHANGE TRADED FUND (ETF)

CROSS REFERENCE TO RELATED APPLICATIONS

This application claims the benefit of U.S. Provisional Application No. 60/947,722, filed Jul. 3, 2007, which is incorporated by reference in its entirety.

BACKGROUND

This invention relates generally to financial services and products, and more particularly to a multi-basket structure for exchange-traded funds (ETFs) and other similar investment vehicles.

Exchange-traded funds, or ETFs, are securities that represent a legal right of ownership over an underlying portfolio of securities or other assets held by the issuing fund. The assets held in an ETF may include individual stocks, bonds, cash, commodities, derivatives, or any tradeable asset, including contracts based on the value of any of the foregoing. Shares of an ETF are designed to be listed on a securities exchange and traded over the exchange just like other securities. ETFs thus allow an investor to own a set or "basket" of assets by simply purchasing shares in the individual ETF. Many existing ETFs hold a mix of assets that aim to replicate or otherwise match the characteristics of a particular published index. These ETFs allow investors to get exposure to the particular index by purchasing shares of the single ETF. Because of their low cost and tax advantages, ETFs have grown in popularity in recent years.

An ETF is a type of regulated investment fund with characteristics of both an index mutual fund and a closed-end fund. An ETF resembles an index mutual fund in that an ETF generally holds a basket of securities designed to replicate the returns of a securities index, has lower fees than comparable actively-managed mutual funds, and is required to permit daily redemptions at the current value of its holdings. An ETF resembles a closed-end fund in that its shares trade on an exchange throughout the trading day and most investors buy and sell shares on the exchange (rather than direct purchases and redemptions from the fund itself, as is the case with mutual funds). Until recently, the only ETFs approved by the Securities and Exchange Commission (SEC) have been index-based strategies. The SEC has more recently approved the first active (i.e., actively-managed) ETFs; however, these active ETFs must disclose the ETF's portfolio holdings daily.

As the *Wall Street Journal* has written, "ETFs generally have lower expenses than traditional mutual funds (including index funds), and they trade throughout the day on an exchange, while mutual funds' price are set just once daily. They're also markedly more tax-efficient than mutual funds, and investors know exactly what they're buying because holdings are completely transparent." Unlike mutual funds, most transactions in ETF shares are conducted in the secondary market (i.e., on an exchange) and do not involve the movement of assets in or out of the fund. In the case of transactions in creation units that do involve the movement of assets into or out of the fund, the transactions are routinely effected by giving the redeeming shareholder its pro rata share of the fund's holdings, which does not impose trading costs or adverse tax consequences on the remaining shareholders.

ETFs have two types of investors: large, institutional, sophisticated trading desks, known as "Authorized Participants," that transact directly with the ETF, and everybody else. All investors, including Authorized Participants, can buy and sell shares of an ETF on an exchange throughout the trading day, like a stock, including the ability to sell shares "short." In addition, Authorized Participants can purchase or redeem shares from the ETF at the current value of the ETF's holdings at the end of each trading day, but must do so in large blocks of shares (sometimes referred to as "creation units"). Purchases and redemptions of creation units are typically done by means of the Authorized Participant and the ETF exchanging ETF shares for a block of the ETF's underlying holdings having a value equal to the ETF shares. This has the effect of low fees and low trading costs associated with ETFs. Because ETFs deal directly only with a few dozen Authorized Participants, their administrative costs are lower than is typical for mutual funds. The administrative savings are generally passed on to ETF shareholders through low fees. In addition, because ETFs transact with Authorized Participants in kind by exchanging ETF shares for fund holdings, or vice versa, they do not need to buy or sell securities in response to daily cash flows like a mutual fund. Instead, the costs of buying and selling securities as the result of movements in and out of the fund are externalized to the Authorized Participants.

The ETF structure also provides Authorized Participants and other large financial institutions the ability to engage in arbitrage and market making activities in ETF shares. Authorized Participants may buy or sell shares on the exchange, or also purchase or redeem shares directly from the ETF at the current value of the ETF's holdings. In the event that the trading price of an ETF's shares on an exchange drifts away from the current value of the ETF's holdings, an Authorized Participant can make a trading profit by exploiting such price differences. By engaging in such arbitrage and market making transactions throughout the trading day whenever an ETF's share price varies significantly from the value of its underlying holdings, the Authorized Participants quickly provide liquidity whenever there is an imbalance of buy or sell orders for ETF shares that may otherwise cause the shares to trade at a premium or discount. By supplying this liquidity, the Authorized Participants create tighter spreads in the marketplace and generally ensure that the exchange price generally tracks the value of the ETF's holdings closely, which benefits all investors.

But although there are a large number of ETFs that hold many different types of assets, the current ETF structure poses challenges in managing securities across certain asset classes, market segments, or in connection with other investment strategies (such as an actively managed investment strategy). This limitation is due to a variety of factors, including: (a) liquidity of the underlying assets or relevant market, (b) accessibility to the underlying assets or relevant market, (c) ability to create an effective tax management strategy, (d) transaction costs associated with the underlying assets or the relevant market, and (e) concerns regarding the transparency of portfolio holdings (e.g. in a non-passive investment strategy).

One reason for this limitation is the single basket structure of existing ETFs, which defines how shares of an ETF are created and redeemed. The list of all the component securities required to be delivered in connection with the issuance of shares of an ETF is commonly termed a "basket." The basket for an ETF generally represents a proportional slice of the fund's holdings. In current ETFs, creation and redemption of shares are primarily made via an in-kind transfer of the securities held in the ETF according to the published basket. Existing ETFs thus use the same basket, published daily to the market, for creation and redemption of shares.

This single basket structure used for existing ETFs is limited, however, in that it requires the ETF's creation basket to consist solely of securities already held by the fund because only those securities are available for in-kind redemption. The single basket structure is also limited because it requires the ETF's redemption basket to consist of securities the ETF is willing to acquire, because the redemption basket is also the creation basket, rather than securities the ETF wishes to dispose. As a consequence of these limitations, existing ETFs generally must make changes to their portfolio by selling and purchasing securities in the secondary market, which imposes additional transaction costs on the ETF and detracts from the ETF's benchmark tracking and tax-efficiency.

These limitations also prevent the trading and management flexibility needed to address matters posed by asset classes or investment strategies involving less liquid, less accessible assets. Most existing ETFs invest in assets that are to some extent highly liquid and actively traded and therefore readily available in the market. For example, most ETFs track U.S. equity indexes comprised of stocks of companies that are normally highly liquid and readily accessible on a secondary market. Similarly, U.S. treasury bills, notes, and bonds are also generally liquid and accessible. In contrast, certain international and emerging market securities are not as generally liquid or accessible. In addition, certain fixed income securities are also not generally liquid or accessible, to the extent that different instruments issued by the same issuer generally have materially different terms, and similar instruments issued by different issuers generally have materially different credit risk.

Due to their lack of accessibility, transparency, and/or liquidity in the underlying market, certain types of assets are or may be difficult to hold in a traditional single basket ETF. This might be true for certain types of bonds, such as U.S. municipal bonds or non-US corporate bonds. Since the market for these types of bonds is generally less liquid than for U.S. taxable investment grade bonds, they may not be traded more than a few months after they are first issued. If a traditional single basket ETF structure were used for exposure to municipal bonds, an Authorized Participant would be unable to obtain all the required assets (e.g., the particular mix of municipal bonds contained within the ETF) to create shares of an ETF. Other types of illiquid or less accessible assets pose similar issues.

Accordingly, the limitations of traditional ETF structures create problems for effectively managing an ETF portfolio that comprises certain types of assets, including difficulties in tax management, benchmark tracking, fund compliance, and fund transaction cost management. Further, these problems transfer to the market makers trading the ETF in the primary and secondary markets in terms of their ability to buy in to and sell out of the deposit securities required for creating and redeeming the ETF as well as making cost effective markets.

SUMMARY

Embodiments of the invention provide an ETF with a multi-basket structure, allowing shares of the ETF to be created using a different basket of assets than the basket of assets required to redeem shares of the ETF. In one embodiment, a method for administering a multi-basket ETF comprises providing shares of the ETF to investors in exchange for assets defined in a published creation basket, providing assets defined in a published redemption basket to investors in exchange for shares of the ETF, and publishing a holdings basket that represents the assets held in the ETF. In another embodiment, a method for administering an ETF comprises delivering shares of the ETF to an Authorized Participant or investor in exchange for an in-kind creation basket of assets, and redeeming shares of the ETF from an Authorized Participant or investor in exchange for an in-kind redemption basket of assets, the creation basket including different assets than the redemption basket. In another embodiment, a method for administering an ETF comprises, for each of a number of trading days, publishing a portfolio composition file for the ETF, the portfolio composition file including a creation basket, a redemption basket, and a holdings basket. The method further comprises, for one or more of the trading days, accepting orders to create an aggregation unit for the ETF based on the published creation basket and accepting orders to redeem an aggregation unit for the ETF based on the published redemption basket. Various other modifications and combinations of features for the multi-basket structure are possible to provide various financial products and to achieve a number of financial objectives, as described herein.

In contrast to the existing single basket ETF structure, a multi-basket structure allows for security constituent differences between the portfolio holdings, the in-kind creation basket and in-kind redemption basket. This means that securities delivered by the primary market participants to the ETF for an in-kind creation may be different than securities received by market participants from the ETF upon in-kind redemption. The securities within the in-kind creation and in-kind redemption baskets may often not represent a pro-rata slice of the portfolio holdings.

The existing ETF single-basket in-kind creation and in-kind redemption mechanism may provide distinct advantages to ETF shareholders when compared to mutual fund shareholders, including cost and tax advantages. First, an in-kind creation externalizes costs for ETF shareholders when new investors are entering an ETF, since the fund is not required to purchase securities for more ETF shares to be issued. Second, an in-kind redemption provides tax efficiency for ETF shareholders, since a redemption request does not require the fund to sell securities for shareholders leaving the ETF. In a typical mutual fund however, these security sales could create capital gains for the remaining fund shareholders.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Process Flow for an ETF

Figure 1:
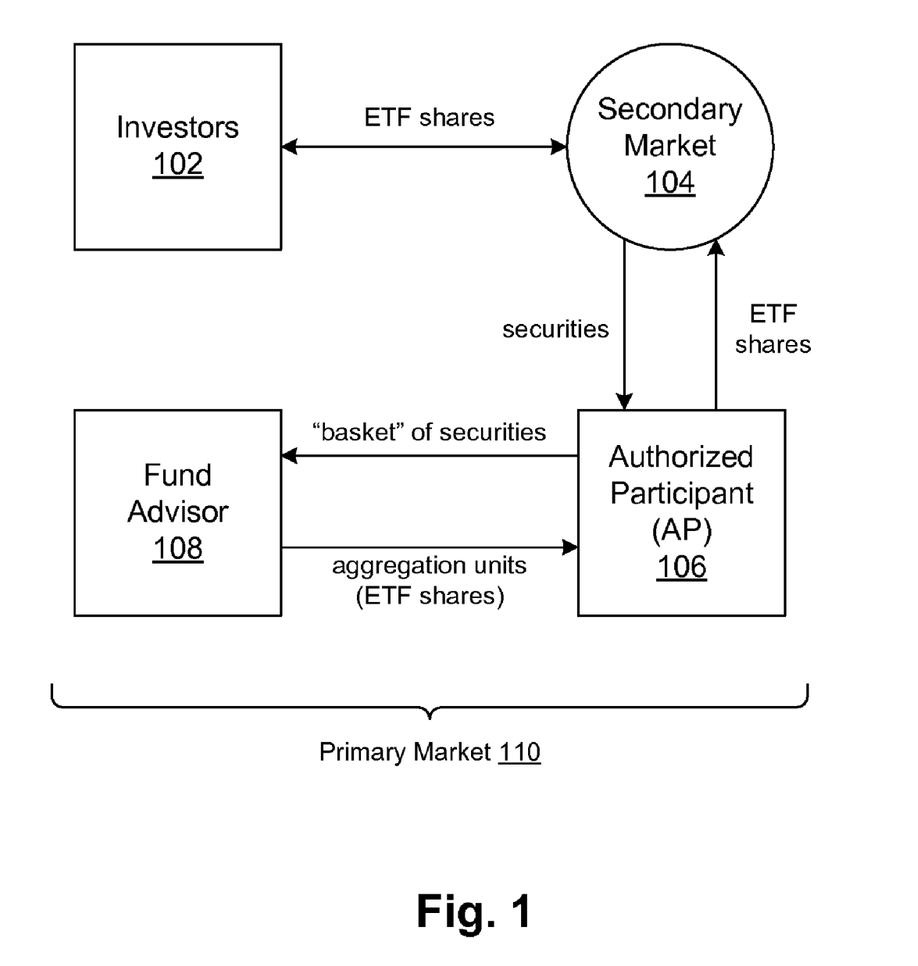
FIG. 1 illustrates a simplified creation process for an ETF, in accordance with an embodiment of the invention.

The shares of an ETF are generally made available to investors 102 through a two-tiered market structure, which includes a primary market 110 and a secondary market 104. FIG. 1 illustrates a simplified creation process for an ETF (or "fund"), in the primary market 110 in accordance with one embodiment. In the primary market 110, issuance of new shares of the ETF can be created only in multiples of a minimum block of shares ("creation units"). Because of the large size of the minimum creation units required for purchases of new ETF shares, such shares are generally only available in the primary market 110 to certain institutional investors known as "Authorized Participants" 106. Authorized Participants 106 are typically large institutional broker dealers or market makers that transact directly with an ETF for purchases of creation units of the ETF shares at the end of day net asset value ("NAV") for the ETF.

As shown, the consideration for purchase of a creation unit of an ETF generally consists of a deposit of a basket of securities via an in-kind exchange of those securities and a deposit of cash to make up any difference between the value of the deposit securities delivered into the ETF and the value of the shares of the ETF (or NAV) issued by a fund advisor 108 to the Authorized Participant 106. In certain limited circumstances, cash may also be delivered in lieu of all or a portion of the specified basket of securities if the securities are not available in sufficient quantity or otherwise cannot be delivered or in certain other situations. The deposit securities are obtained and delivered by the Authorized Participant 106 to the fund advisor 108, which are then added to the fund's holdings. The particular mix of securities to be deposited by the Authorized Participant 106 in exchange for the creation units are specified by a "basket," which is published by the fund advisor 108 each business day in a portfolio composition file (PCF) 112.

The opposite process occurs for a redemption of the ETF. In one embodiment, an Authorized Participant 106 can redeem shares of an ETF by delivering a block of the ETF shares (e.g., the same size block as in a creation unit) to the fund advisor 108. In exchange, the fund advisor 108 delivers via an in-kind transfer the deposit securities specified in the published basket (e.g., in the PCF 112) associated with the ETF. In both the creation and redemption processes, a cash component is delivered in either direction to offset any differences between the actual value of the deposit securities and that of the ETF shares exchanged. As stated earlier, in certain limited circumstances, cash may also be delivered in lieu of all or a portion of the specified basket of securities if the securities are not available in sufficient quantity or otherwise cannot be delivered or in certain other situations. Also, in various embodiments of the invention, the baskets of securities specified for the creation process may be different than the basket of securities specified for the redemption process, which is described in more detail in the following sections.

In contrast to the primary market 110, in which Authorized Participants 106 may transact for the creation or redemption of creation size units of an ETF, individual investors 102 can access ETF shares in the secondary market 104. Once the block of ETF shares in the creation size units is received by the Authorized Participant 106, the shares may be broken down into less than creation unit sizes (including individual shares) and sold by the Authorized Participant 106 directly to customers or over a secondary market 104, where individual investors 102 may buy and sell shares of the ETF through their brokerage accounts. An intermediary, such as a broker/dealer or financial advisor, may advise investors 102 directly and recommend and sell the ETF shares.

Figure 2:
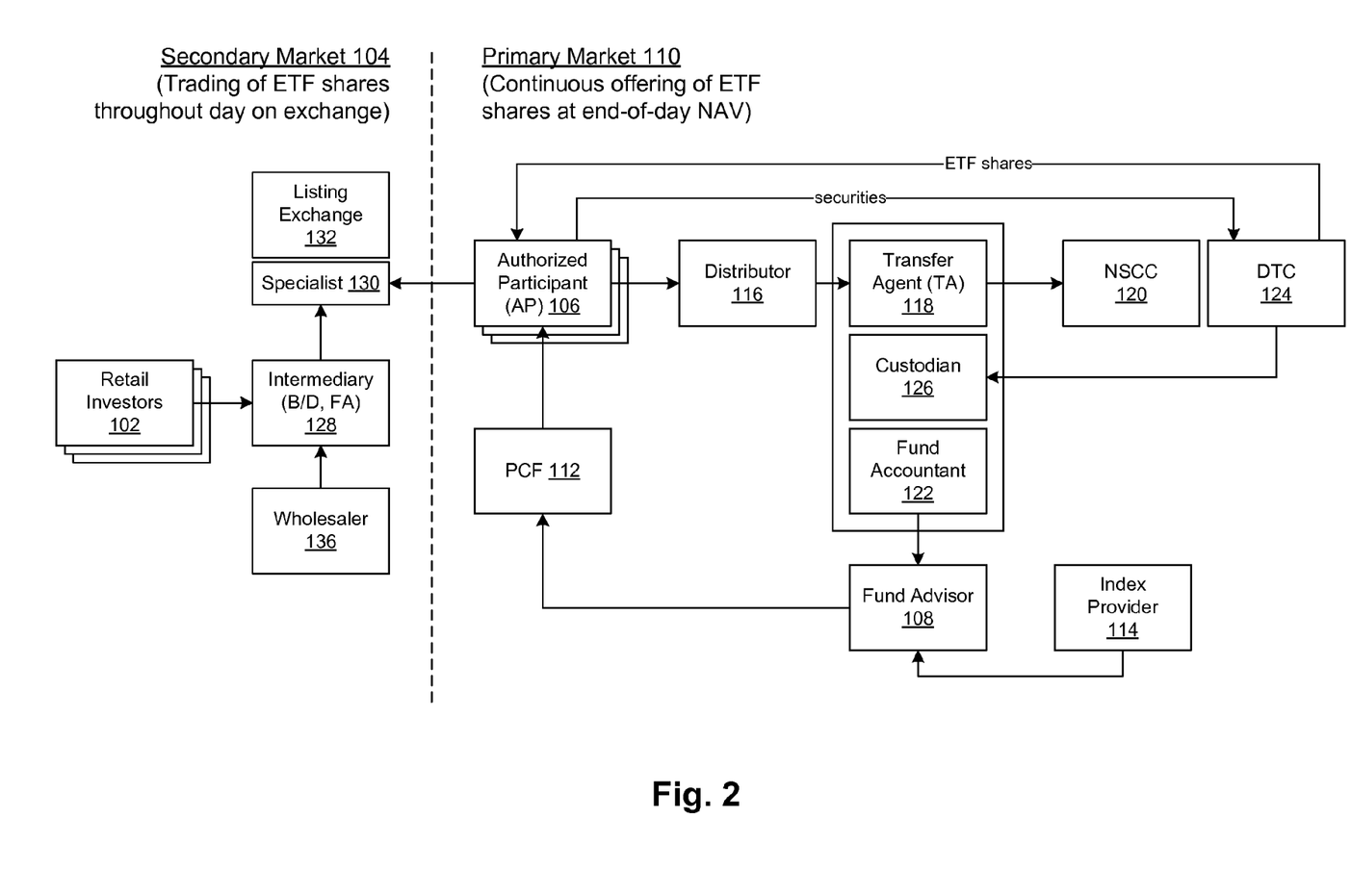
FIG. 2 illustrates an ETF process flow, in accordance with an embodiment of the invention.

FIG. 2 illustrates a more detailed ETF process flow, in accordance with an embodiment of the invention, outlining the roles of additional participants to the process. The table below describes the parties illustrated in FIG. 2 and their respective roles, in accordance with one embodiment. The parties described below and their roles exist for certain embodiments of an ETF, and other embodiments may include additional and/or fewer parties, with the same, different, or overlapping roles. For an actively-managed ETF, for example, the index provider may not be needed, since the ETF is not tracking an index.

| Party | Roles |
|---|---|
| Index Provider 114 | The Index Provider 114 is the source of the index data (e.g., S&P, Dow Jones, or Russell). |
| Fund Advisor 108 | The Fund Advisor 108 manages the funds to seek to track their respective benchmark index. |
| | The Fund Advisor 108 determines the component stocks required to be delivered to effect a creation order, called the Portfolio Composition File (PCF) 112. |
| | The PCF 112 is transmitted to the NSCC 120 nightly, which disseminates the information to all participants. |
| Authorized Participant (AP) 106 | The Authorized Participant 106 places creation (or redemption) order to facilitate issuance of new shares. |
| | Creation Orders are based on the previous day's Portfolio Composition File 112 in multiples of usually 50,000 shares. |
| | Creation Orders are effective (like any other mutual fund) at the end-of-day NAV. |
| | Creation Orders are settled by delivering securities (detailed in the PCF 112) instead of cash. |
| | The specialist may be an AP, although other large broker/dealers may be APs as well. |
| Distributor 116 | The Distributor 116 processes creation/redemption orders and insures that they are in good form. |
| | The Distributor 116 then passes valid orders to the Transfer Agent 118 for record keeping and processing. |
| Transfer Agent (TA) 118 | The Transfer Agent 118 records creation/redemption orders. |
| | The Transfer Agent 118 tracks orders on a creation unit basis and monitors total shares outstanding. |
| | The Transfer Agent 118 transmits creation orders to the NSCC 120 for 'bursting' into the component stocks (detailed in the PCF 112). |
| NSCC 120 | The NSCC 120 "bursts" creation unit orders into their underlying position. |
| | At settlement, the NSCC 120 facilitates the movement of stocks versus ETF shares in the DTC accounts 124 of the counter-parties, including the custodian 126. |

-continued

| Party | Roles |
|---|---|
| Fund Accountant 122 | As with any mutual fund, the Fund Accountant 122 prices the securities and calculates the net asset value (NAV) each day. |
| Secondary Market Investors 102 (Retail and Institutional) | Investors 102 trade ETF shares in the secondary market 104 as with any listed common stock. |
| Intermediary 128 | Intermediaries (B/D, FA) 128 advise client investors 102 directly and sells/recommends ETF shares, possibly in connection with wholesaler 136. |
| Specialist 130 | A Specialist 130 creates a fair and orderly market for ETF shares on the exchange floor (i.e., ETF shares trading post). This allows the Specialist 130 to regulate the supply of new ETF shares (Creation/Redemption) in response to customer demand in the secondary market. |
| Listing Exchange 134 | The Listing Exchange 134 (e.g., NYSE or AMEX) lists the ETF units and records trading prices/volumes. |

Multi-Basket Structure for an ETF

Figure 3:
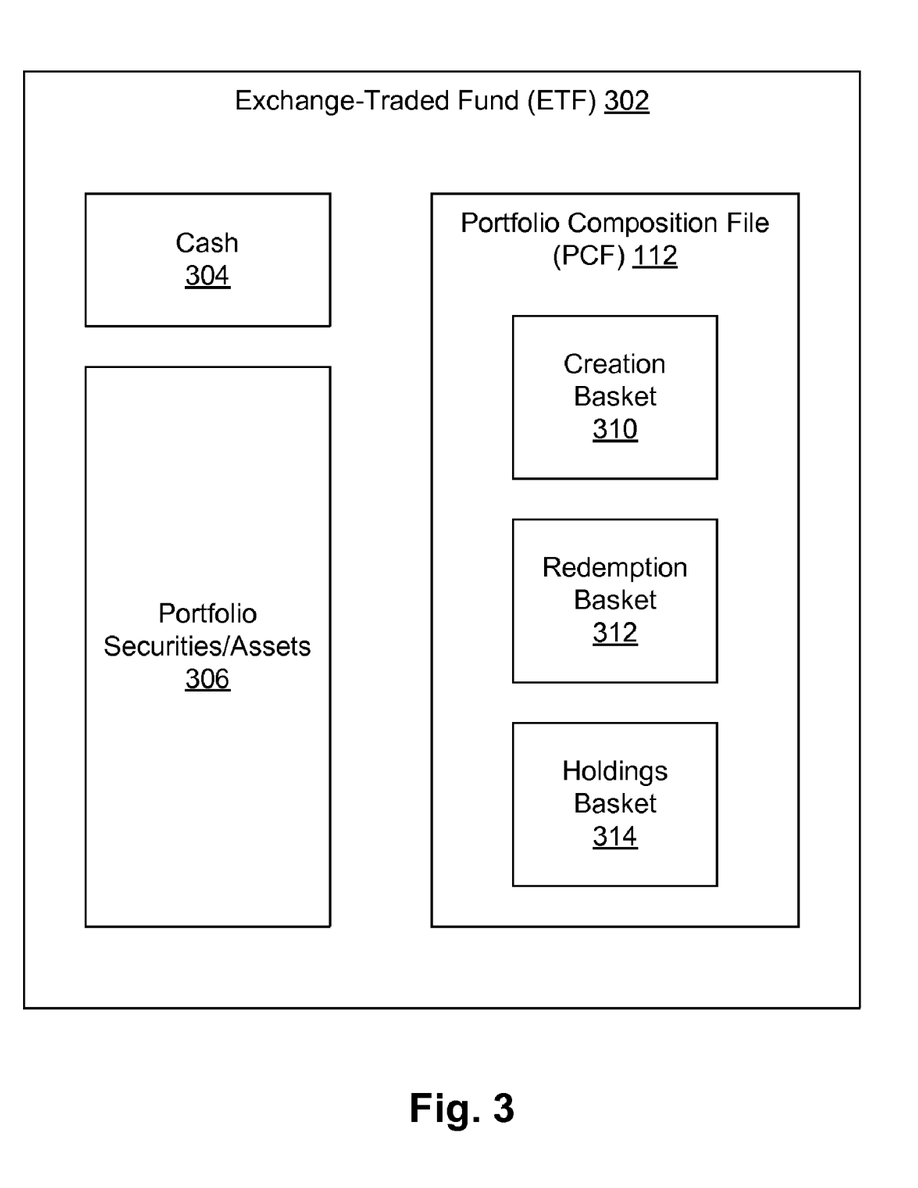
FIG. 3 illustrates an example ETF having a multi-basket structure, in accordance with an embodiment f the invention.

To address the limitations of a single basket structure for an ETF, embodiments of the invention provide a multi-basket trading structure for an ETF. In one embodiment, separate baskets are published for the creation and redemption of the shares of the ETFs. The creation basket defines the assets that must be delivered to obtain shares of the ETF (which may be in creation units), and the redemption basket defines the assets that would be provided upon redemption of shares of the ETF (which may also be in creation units). Furthermore, unlike in current ETFs the creation and redemption baskets need not be representative of the actual holdings of the fund. In addition, a holdings basket (or "portfolio basket," or "valuation basket") may also be published, which can be used to report the holdings in the fund for valuation, transparency, and other reporting purposes. FIG. 3 illustrates a structure for an example ETF 302, showing the multi-basket structure and the actual portfolio holdings in the fund.

In one embodiment, a multi-basket ETF structure is used to enable an ETF 302 that contains less liquid or accessible type of assets 306, such as municipal bonds. The ETF 302 may also hold some amount of cash 304. In one embodiment, the creation basket 310 may be used for the relatively accessible municipal bond issues (including issues not currently held by the ETF 302) to enhance the Authorized Participant's ability to access the portfolio assets 306 in a cost effective manner, since these issues must be acquired and delivered by an Authorized Participant to the ETF manager to obtain shares of the ETF 302. Accessibility of the underlying municipal securities also enables market makers to provide greater liquidity in the ETF 302 through bid/ask prices in the market that correspond to prices at which Authorized Participants can transact in the underlying securities 306 for creation and redemption purposes. This allows for more effective management of the market maker's costs in transacting in the ETFs, providing greater liquidity in the ETF 302 which may result in lower transaction costs for investors.

Accordingly, the assets included in the creation basket 310 may be selected based on factors and/or characteristics related to the assets 306 of that particular fund 302 (e.g., liquidity and accessibility for municipal bonds and emerging market securities). The assets in the creation basket 310 may then be selected based on consideration that may include one or more of: (1) whether a particular asset is sufficiently liquid; (2) where the ETF 302 is indexed (i.e., if the investment strategy for the fund 302 is to track a published index) to promote benchmark tracking for the entire fund, meaning whether the mix of selected assets will cause the fund's composition to track the index sufficiently; (3) any other fund compliance issues; (4) the accessibility of the particular assets; (5) transaction costs related to acquiring the assets or entering the relevant market; (6) the ability to create an optimal tax management strategy; and (7) the level of transparency desired of the portfolio holdings of the fund.

The assets selected for the redemption basket 312 are those that will be delivered from the fund's holdings upon a redemption, which may be a wholly different set of securities than those included in the creation basket 310. In consideration of this, a fund manager may select the assets for the redemption basket 312 based on optimal tax management strategies. The assets selected for the redemption basket 312 may also be selected to help maintain the desired mix of assets in the fund 302. For an indexed ETF this desired mix may be an asset mix that achieves a high level of tracking to the relevant index while maintaining an optimal level of liquidity and pricing transparency.

As the holdings basket 314 includes a representation of the actual holdings 306 of the fund 302, its publication and dissemination to the market may be used to satisfy intra-day pricing requirements for the portfolio, as well as any needs to report the ETF's portfolio holdings. Embodiments of the multi-basket structure also allow ETF managers to more effectively provide investors with ETFs that are low cost, index tracking or actively managed, tax efficient, transparent, and liquid, while adhering to sound investment principals that execute on the communicated strategy.

Example

Municipal Bond ETF

While a great many uses are possible for embodiments of the multi-basket ETF structures described herein, the following description is provided for an example ETF that holds municipal bonds and attempts to track a published index for municipal bonds. The traditional single basket ETF structure may be ineffectual for municipal bonds, as the market for municipal bonds is generally less liquid and less fungible than for taxable bonds, and many municipal bond issues cease to be actively traded within months of issuance. As a result, it may be hard to acquire significant amounts of many municipal bond issues that have been outstanding for some time. An Authorized Participant would likely not be able to obtain new ETF shares because doing so would require purchase and delivery of a representative set of the municipal bonds held by the ETF. But this representative set would be difficult or impossible to access on the secondary markets without significant transaction cost, thereby making it impractical for the Authorized Participant to create new ETF shares. If Authorized Participants are unable to create new shares of the ETF promptly when market conditions warrant, inefficiencies in the trading market may result such as wider spreads in the secondary market or mispricing of the ETF in relation to its underlying assets.

Because this problem has remained unsolved, ETFs to date have not been able to hold illiquid, nonfungible asset classes such as municipal bonds. Accordingly, the multi-basket structure in accordance with embodiments of the invention deals with this problem by separating the creation basket from the redemption basket and defining a creation-only basket that contains only accessible securities so that an Authorized Participant can obtain the requisite securities on a secondary market and make the required in kind transfer to obtain new shares of the ETF. The fund has a separate redemption basket for redeeming the shares, which will consist of securities that need not be currently accessible in the market but which the ETF desires to dispose of for tax-management or other reasons.

The creation basket will generally be a subset of the securities in the index that the fund tracks that has been selected, using portfolio optimization techniques, to maximize the current liquidity of the creation basket relative to the fund's holdings and its index. The creation basket may be constructed using a scoring system designed to assess the relative accessibility of the securities while also attempting to track the index closely. In one embodiment, the method for selecting securities to put in the creation basket comprises: (1) using a liquidity (or "accessibility") scoring mechanism to narrow the securities that may be placed in the creation basket; and (2) selecting some from among the narrowed candidate set of securities to add to the creation basket to achieve a sufficiently high level of tracking to the index (e.g., should the basket be added to the fund upon issuance of a creation unit of shares). A tracking score may be used to measure the degree to which the fund's portfolio tracks the index, based for example on characteristics and risk/return profiles of the holdings.

At the fund's launch, the redemption basket will likely correspond to the fund's holdings. As the fund grows and holds more securities that have decreasing liquidity, the redemption basket will likely contain a different set of securities than those in the fund's portfolio or in the creation basket. It is possible that at any time the redemption basket will not have any of the securities that are included in the creation basket. Since the redemption basket represents securities that will be delivered to the Authorized Participant upon redemption of ETF shares (hence, the fund actually possesses the securities), the securities selected for the redemption basket may be selected without regard to their current accessibility in the market.

The holdings basket includes a representation of the actual holdings of the fund. The holding basket may thus be used to calculate a intra-day indicative value (IIV) of the fund, which will be published to the market via the listing exchange (usually on the Consolidated Tape) to meet regulatory requirements—as well as for market making, other valuation, and hedging purposes.

At the launch of a particular ETF, the creation, redemption, and holdings baskets will be identical, in one embodiment. Because the creation basket will be focused on the most accessible securities in the ETF's underlying index, and the redemption basket will be focused on securities that are not required for index tracking purposes and/or have embedded capital gains, over time the three portfolios will tend to diverge in terms of their constituent securities. However, the creation and redemption baskets may be constructed so that the overall holdings of the fund always tracks the index within acceptable parameters.

Time since issuance is an important determinant of the accessibility in the market of certain fixed income instruments, including municipal bonds. Such securities tend to be actively traded for the first several months from issue, and then become increasingly uncommonly seen in the secondary market as they are acquired by investors who seek to hold the securities until their maturity. Because of this, it is expected that the creation basket may change frequently based on the current accessibility of securities, which is not a factor relevant to the redemption basket.

Applications for the Multi-Basket ETF Structure

In addition to ETFs that hold municipal bonds or other illiquid, nonfungible fixed income securities, there exist many other applications of the multi-basket ETF structures described herein. For example, the multi-basket structure may be used to manage a suite of actively-managed ETFs, in which the multiple baskets may be desirable to separate the portfolio holdings information of the ETF from the published creation and redemption baskets. This helps to preserve the active strategy of the ETF, which many fund managers would wish to keep secret, for example, to avoid the potential risks of "free-riding" and "front-running." Specifically, investors may be able to "free-ride" on a manager's strategy by simply copying the trading strategy, or investors may be able to "front run" the manager by executing trades before the manager if the portfolio holdings were to be disclosed frequently. The multi-basket structure, which may allow a fund manager to hide the active strategy through the use of different creation and redemptions baskets, which may help prevent these from occurring.

A multi-basket ETF structure may also be used on existing ETF products to improve the daily management of transaction costs, tax efficiency, accessing illiquid or inaccessible markets or securities, benchmark tracking fund compliance and generally meeting fund investment objectives, as described in more detail below. Accordingly, embodiments of the invention may apply to the basic multi-basket structures described herein, and not necessarily to any particular application or asset type described in an example embodiment.

While ETFs have traditionally been structured as open end investment companies or unit investment trusts, relatively newer exchange traded vehicles have emerged such as exchange traded grantor trusts that behave similar to ETFs which may also benefit from the multi-basket structure invention. Such exchange traded products (ETPs) also trade on listing exchanges throughout the day similar to ETFs but have a different legal structure. The underlying assets of the ETPs may be commodities (such as gold or currency), a portfolio of securities or futures contracts and may or may not track an index. The multi-basket ETF structure would apply to ETPs that invest in nonfungible assets.

Features of Multi-Basket Structure

Although the single-basket creation and redemption mechanism of the traditional single basket ETF structure presents cost and tax advantages over mutual funds, there are additional common ETF problems. The multi-basket structure addresses many of the issues that the single basket structure faces. Generally speaking, the multi-basket structure allows the ETF to "optimize" the in-kind creation and in-kind redemption baskets as needed to solve an impasse or challenge. Some of the common impasses and/or challenges to managing ETF portfolios may include, but are not limited to:

(1) transaction costs; (2) tax inefficiencies; (3) illiquid and/or inaccessible markets or securities; (4) meeting regulatory requirements; and (5) meeting fund investment objectives. Generally, the multi-basket solution offers ETFs greater flexibility to grant investors the opportunity for additional transaction cost savings, increased tax efficiency, access to less liquid and/or less accessible markets, meeting regulatory requirements, and meeting fund investment objectives. Within each theme, there are specific examples of how the multi-basket structure illustrates solving specific problems.

Transaction Costs

Transaction costs are not limited to being associated to investor/shareholder action. ETFs also need to transact for other reasons, including but not limited to rebalancing portfolios to better track or beat a designated index and/or meet investment objectives, managing index methodology changes and managing position limits or large trades due to a fund's growth in assets. Limiting or eliminating the need for portfolio trading for all these examples helps the ETF effectively keep costs down. All shareholders benefit from lower trading costs.

This issue may arise for rebalancing portfolios. The ETF may sometimes need to sell or buy securities to adhere to changes to its underlying index or to affect changes to an active (i.e., desired) investment objective. In the case of adding desired securities to the portfolio, the ETF may simply add the selected securities in a creation basket. Conversely, in the case of deleting desired securities from the portfolio, the ETF may simply remove the selected securities from the creation basket and include them in the redemption basket. Each basket would be tailored to follow a given objective to rebalance the portfolio. Subsequent creations or redemptions of the fund will help affect the objective of the rebalance. If securities are being added and securities are being deleted at the same time, the ETF can then tailor both baskets using the process above as needed.

The issue of transaction costs may also arise when rebalancing portfolios. For example, the investment adviser may wish to change the composition of the securities in the portfolio to improve upon certain features of the fund, such as better index tracking, cost efficiencies, or tax efficiencies. This change may not be prescribed by index methodology or an active strategy, but it is an enhancement to the investment adviser's current trading and portfolio management methods. For example, the investment adviser may face challenges in managing foreign funds that track an index because of foreign ownership limits in certain securities or illiquidity of certain securities. Over time, these challenges may increase and the portfolio manager could decide to hold another type of security, like an ADR, to obtain exposure to the problem security without having to purchase it locally. In using multiple baskets, the investment adviser may tailor the creation basket to include the desired securities to the portfolio and tailor the redemption basket to include unwanted securities to remove them from the portfolio. Subsequent creations or redemptions would affect the objective of the portfolio transition and minimize transaction costs to the fund because the fund did not have to go to market to buy and sell the selected securities.

Tax Efficiency

Fund managers are sometimes faced with having to engage in market transactions with respect to a fund's portfolio for various reasons. Such market transactions may result in the sale of securities that have a low cost basis which are then likely to generate capital gains. Using the single-basket structure, an ETF may avoid or reduce the likelihood of this result by having the securities exit the ETF through an in-kind redemption. Using the multi-basket structure, the investment adviser is also able to minimize capital gains through use of in kind redemption by including the applicable security in the redemption basket, however the adviser is able to do so without regard to whether the security is included in the creation basket, thus allowing the tax benefits associated with the in kind redemption mechanism of ETFs to stay intact, while providing additional portfolio management flexibility in determining the securities desired for creation and redemption purposes.

Another benefit that the multi-basket structure provides is the ability to manage certain trading transactions that occur over the short term from being characterized as wash sale for tax purposes. A wash-sale is an IRS rule prohibiting a tax loss from being claimed on the sale of an investment if that same investment is purchased within 30 days before or after the sale date. Within the multi-basket structure, the investment adviser has the flexibility to exclude any security sold from the portfolio from the in-kind creation basket for 30 days after the sale, while still including it in the redemption portfolio if desired. This allows the ETF to claim the tax loss earned from the sale of the security, which would otherwise be prohibited in a single basket structure if a new in-kind creation order included the same security. Under the single-basket structure, since the in-kind creation basket is the same as the in-kind redemption basket, a new in-kind creation order within 30 days of the ETF's sale would trigger the wash sale rule, prohibiting the ETF from claiming the earned loss from the prior sale. The benefit to shareholders is the ETF's ability to claim tax losses, which decreases the chance or amount of the ETF distributing capital gains.

Another benefit of the multi-basket structure is that it may allow a the investment adviser to optimize the in-kind creation basket for securities eligible for the qualified dividend income (QDI) tax rate, and lower the tax liability of the ETF. Under a single-basket structure, the portfolio holdings are generally identical to the in-kind creation basket, which may limit the adviser's ability to transition or implement an optimization strategy that takes into account securities eligible for the lower 15% tax rate. The multi-basket structure allows the investment adviser the ability to include an eligible security in a new creation basket regardless of whether such security is held by the fund's portfolio or included in the redemption basket and available for redemption of the ETF. As a result, the multi-basket structure provides the investment adviser greater flexibility and the ability to more readily implement the changes to the optimization strategy (to consider QDI or other tax management strategies), which benefits shareholders by potentially lowering their income tax liability.

A specific example of this is an ETF holding an American Depository Receipt (ADR) instead of the underlying local share class of the security in its portfolio. In this example, the investment adviser may evaluate the index for those securities with available ADRs and would select those ADRs for inclusion in the creation basket. Similarly, the investment adviser may exclude the locally listed securities from the creation basket and continue to include them in the redemption basket, which over time would result in the fund's holding more QDI eligible securities. The effect of increasing the number of QDI eligible securities in the fund may result in increased after-tax returns, since the income derived from these securities is taxed at the lower tax rate.

Less Liquid or Less Accessible Markets or Securities

The municipal bond market is an example of a market that can be difficult to access. At times, it may be only a particular security within a particular market that is inaccessible or illiquid, and the investment adviser would like the flexibility to substitute that security with a different security within the portfolio. The multi-basket structure provides the flexibility for this type of optimization. For example, the holdings of a portfolio may include a security that is no longer available in the market (e.g., foreign ownership limits for a security have been met). Using a single-basket, a current solution for this problem involves the investment adviser excluding the illiquid or inaccessible security from the single-basket and replacing its market value with cash. The Authorized Participant delivers that cash to the fund, and the portfolio manager invests that cash by purchasing a substitute security.

However, using the multi-basket structure, in accordance with embodiments of the invention, the investment adviser can exclude the inaccessible security from the creation basket and include a substitute security in its place. In one embodiment, the substitute suitable security is one that represents the same or similar risk/return profile, or is otherwise consistent with the investment strategy of the ETF. Because the portfolio manager does not have to execute a market trade to purchase the substitute security, the transaction costs associated with the purchase of the substitute security remain externalized from the fund. This benefits shareholders by helping the ETF to more effectively track or beat its designated benchmark while helping to keep the in-kind creation and in-kind redemption baskets intact and as cost and tax efficient as possible.

Additionally, an ETF may seek to meet its investment objective while also being subject to certain prescribed mandates. Two common problems that exist are exceeding position limits on particular securities and meeting diversification requirements.

Certain regulations may prevent a fund from holding more than a specified amount of a security's outstanding shares. These position limits are prescribed at the firm level, and fund holdings need to be monitored so not to exceed them. Using the single basket structure, the investment adviser may choose to excluding an asset from the ETF's creation basket to avoid exceeding such limits, however this does not allow the ETF to continue to include it in its redemption basket. The multi-basket structure provides the increased portfolio management flexibility to replace the undesired security with a substitute security and also allows for the undesired security to remain in the redemption basket if desired or needed.

On a periodic basis, ETFs may be required to adhere to specific regulatory diversification rules, such as those required in order to qualify as a Regulated Investment Company under Subchapter M of the Internal Revenue Code. As the portfolio changes throughout the evaluation period, the portfolio may be close to exceeding certain prescribed concentration limits. To ensure compliance with such rules at the end of the applicable evaluation period, the portfolio manager may exclude the securities from the creation basket that could lead to exceeding concentration limits in the portfolio. Using a multi-basket structure enables the investment adviser the flexibility to exclude those securities from the in-kind creation basket and replace them with substitute securities and potentially avoid having to execute a market transaction to replace or reduce the exposure to maintain compliance with these rules, while continuing to include it in the in-kind redemption baskets. This action allows the investment adviser the ability to keep the portfolio in compliance with position limits and/or diversification rules through the in kind mechanism without incurring portfolio transaction costs. In a single basket structure, issues with respect to exceeding such position limits or issuer concentration limits would likely be resolved by executing market trades to reduce the applicable exposure which result in transaction costs to the ETF. The multi-basket structure provides the investment adviser greater portfolio management flexibility to meet the ETF's investment objective while also satisfying regulatory requirements, however in a more efficient and cost effective manner than the single basket structure.

Meeting ETF Investment Objectives

In general, an ETF has a publicly disclosed investment objective. The multi-basket structure provides greater flexibility to the investment adviser for meeting the ETF's primary objective. For index funds, this objective is typically to track a designated benchmark. For active funds, this objective is typically to beat a designated benchmark. The multi-basket structure provides the investment adviser the flexibility to optimize the in-kind creation and in-kind redemption baskets to help achieve these objectives in a more efficient and effective manner that ultimately benefits shareholders. There are some common occurrences that portfolio managers must manage to meet their funds' investment objectives.

In the case of corporate actions, for example, such as tendering shares, mergers or acquisitions, the investment adviser may determine to pledge shares from an ETF's portfolio holdings to the issuer on the corporate action date. By pledging shares to the issuer, the portfolio manager intends to make them no longer available for sale or redemption. If the security remained in the portfolio and part of pursuant to the single basket structure, there is the risk that the ETF's holdings would be delivered to an Authorized Participant upon a redemption request, which would be problematic. Currently, the investment adviser addresses this potential issue by excluding these assets from the single basket structure and takes cash in lieu of those securities.

The investment adviser does this to avoid the "over-drawing" portfolio holdings for that security. The potential downside is that excluding the security entirely from both creations and redemption activity pursuant to the single basket structure prevents the ETF from receiving additional shares of the security on a creation order, and by taking cash in lieu, the ETF must execute a market trade to acquire additional amounts of the security or another security. By using different creation and redemption baskets, however, the investment adviser may remove the security going through the corporate action from the redemption basket while keeping it in the creation basket for purposes of meeting the ETF's investment objective (e.g. tracking its benchmark index). This provides opportunity for the fund to receive more shares of the security, or another substitute security consistent with the fund's investment strategy through the in-kind creation process and avoid transaction costs, while removing the risk of it being redeemed of creating an over-draft position of that security within the fund.

For securities coming up for a proxy vote, the investment adviser may in effect take the same action as when a security is going through a corporate action. The investment adviser may need or desire to have a minimum number of shares pledged for a particular vote and redemptions create the risk of the ETF not having the correct number of shares on hand at the vote date. Currently, the portfolio manager excludes the security from creation and redemption activity when using the single-basket structure and substitutes cash for those securities. With the multi-basket structure, the investment adviser has the flexibility of keeping the security in the creation basket while removing it from the redemption basket. Again, the benefit is that the ETF can continue to receive additional shares of the security in kind without incurring portfolio transaction costs while minimizing the risk of losing shares in a redemption.

Generally, different securities markets set minimum trading size requirements, known as round lots. For example, in the United States the minimum tradeable lot size is one share, whereas in Japan it is 2000 shares. During the generation of creation and redemption baskets, the net assets of the portfolio holdings are cut into units for the purpose of reporting the relevant securities required for creation and redemption activity to the marketplace. This act of cutting the fund into units can create "odd-lots" in certain securities within the portfolio on a unit level. This is problematic because Authorized Participants may then be unable to transact in these odd-lot quantities in the applicable market.

Currently, within the single-basket structure, when odd-lots present themselves, portfolio managers will typically exclude them entirely from the creation/redemption basket, replacing them with corresponding cash value. Excluding odd-lots from the creation/redemption basket could create incorrect weightings in the portfolio holdings when compared to its benchmark index. To resolve this discrepancy, portfolio managers effect market trades once enough cash is on hand to purchase a round lot of the security. However, these market trades result in transactions costs to the portfolio, which the portfolio manager generally would rather avoid.

Using the multi-basket structure allows the investment adviser much more portfolio management flexibility, with the goal of externalizing transaction costs from the portfolio. Portfolio managers may exclude the odd-lot from the creation basket and may substitute it with a similar security (in round-lot form) consistent with the ETF's investment strategy. For the redemption basket, the portfolio manager can do the exact same thing or continue to exclude the odd-lot from the redemption basket and deliver cash in its place, if cash is available. The benefit this provides is portfolio management flexibility and choice, which allows the ETF to better meet its investment objective, while minimizing transaction costs from the fund's portfolio which overall benefits shareholders.

There are a couple of examples of when an ETF could publish a basket that is different than its portfolio holdings. The desire is to provide market-makers with the transparency of portfolio holdings while also providing a basket that more clearly represents their exposure when creating and redeeming on a particular trading day.

During a large rebalance, for example, the investment adviser may require creations orders consisting of the post-rebalance securities, market-makers require that current, pre-rebalance portfolio holdings be published for transparency and hedging purposes. In this scenario, with a single-basket structure, there is no other option than to publish the single creation/redemption basket to the marketplace and manually send the marketplace the eligible creation basket. In accordance with an embodiment of the invention, the multi-basket structure provides for the publication of both the projected basket (for creations) and the portfolio holdings (for transparency). The benefit is that the market-makers have the information they require to make markets, hedge and affect creations as needed. This benefits shareholders in that market-makers can more appropriately hedge their positions and make markets, which allows for tighter spreads and reduced costs to shareholders transacting in the secondary market.

Foreign issuers sometimes create a foreign share class of the security and a local share class of the security. The difference is that the local share class of the security is available for sale only to investors from the country of origin, and the foreign share class of the security is available to non-domiciled investors. Although an international portfolio will generally hold the foreign share class of the security and creation and redemptions will also include the foreign share class of the security, pricing is not always available in real-time on the foreign share class. This may create problems with market-makers' ability to hedge their positions accurately without real-time pricing or valuation transparency or clarity of the portfolio, since the foreign share class of the security has not been updated with the current market valuation, like the local share class.

Using the multi-basket structure may allow the ETF to publish the creation basket, redemption basket, and portfolio holdings basket with the foreign share class of the security included in each, while also publishing a separate pricing basket with the local share class. One benefit is that market-makers will have more pricing clarity into the value of the security, helping them better hedge their positions. Better hedging allows for potentially tighter markets (spreads) when making markets in the ETF, which allows for reduced trading costs to shareholders transacting in the secondary market.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for administering a multi-basket exchange traded fund (ETF), comprising:
    publishing an electronic portfolio composition file on a non-transitory computer readable medium by a computing system of a fund advisor that administers the exchange traded fund (ETF), the portfolio composition file specifying a creation basket of assets and a redemption basket of assets, wherein the redemption basket and the creation basket specify different assets;
    electronically receiving a creation request from a first authorized participant at the computing system of the fund advisor;
    responsive to the creation request, initiating an ETF creation transaction on a primary market by the computing system of the fund advisor, the ETF creation transaction providing shares of the ETF from the fund advisor to the first authorized participant in exchange for the assets in the creation basket specified in the published portfolio composition file;
    electronically receiving a redemption request from a second authorized participant at the computing system of the fund advisor;
    responsive to the redemption request, initiating an ETF redemption transaction on the primary market by the computing system of the fund advisor, the ETF redemption transaction providing the assets in the redemption basket specified in the published portfolio composition file to the second authorized participant in exchange for shares of the ETF; and
    publishing a holdings basket that represents the assets held in the ETF.

2. A method for administering an exchange traded fund (ETF), the method comprising:
    publishing an electronic portfolio composition file on a non-transitory computer readable medium by a computing system of a fund advisor that administers the exchange traded fund (ETF), the portfolio composition file specifying a creation basket of assets and a redemption basket of assets;
    electronically receiving a creation request from a first authorized participant at the computing system of the fund advisor;
    recording on a non-transitory computer readable medium, in connection with an account of the fund advisor, a transfer in a primary market of shares of the ETF from the fund advisor to the first authorized participant or investor in exchange for an in-kind creation basket of assets specified in the published portfolio composition file;
    electronically receiving a redemption request from a second authorized participant at the computing system of the fund advisor; and
    recording on a non-transitory computer readable medium, in connection with the account of the fund advisor, a transfer in a primary market of shares of the ETF from the second authorized participant or investor to the fund advisor in exchange for an in-kind redemption basket of assets specified in the published portfolio composition file, the creation basket including different assets than the redemption basket.

3. A method for administering an exchange traded fund (ETF), the method comprising:
    for each of a number of trading days, publishing a portfolio composition file on a non-transitory computer readable medium by a computing system of a fund advisor that administers the exchange traded fund (ETF), the portfolio composition file including a creation basket, a redemption basket, and a holdings basket, wherein the redemption basket and the creation basket specify different assets;
    for one or more of the trading days, accepting creation orders received from a first authorized participant at the computing system of the fund advisor to create an aggregation unit for the ETF based on the published creation basket, and responsive to one or more of the creation orders order initiating an ETF creation transaction on a primary market by the computing system of the fund advisor, the ETF creation transaction providing shares of the ETF from the fund advisor to the first authorized participant in exchange for the assets in the creation basket specified in the published portfolio composition file; and
    for one or more of the trading days, accepting redemption orders received from a first authorized participant at the computing system of the fund advisor to redeem an aggregation unit for the ETF based on the published redemption basket, and responsive to one or more of the creation orders order initiating an ETF redemption transaction on the primary market by the computing system of the fund advisor, the ETF redemption transaction providing the assets in the redemption basket specified in the published portfolio composition file to the second authorized participant in exchange for shares of the ETF.

4. The method of any one of claims 1-3, wherein the ETF holds municipal bonds.

5. The method of any one of claims 1-3, wherein the creation basket includes assets selected to have a relatively high amount of liquidity within a candidate set of assets that are in compliance with an investing strategy for the ETF.

6. The method of any one of claims 1-3, wherein the creation basket includes assets selected based at least in part on a criteria selected from a group consisting of: transaction costs, accessibility, and transparency of portfolio holdings information.

7. The method of any one of claims 1-3, wherein the redemption basket includes assets held in the ETF that are selected to promote most efficient tax management.

8. The method of any one of claims 1-3, wherein the ETF holds less liquid equities.

9. The method of any one of claims 1-3, wherein the creation and redemption baskets include a mixture of assets that is different from the holdings of the ETF.

10. The method of any one of claims 1-3, further comprising:
    determining a target set of assets for the ETF;
    adjusting at least one of the creation basket and the redemption basket responsive to the determined target set of assets.

11. The method of claim 10, wherein the target set of assets includes more of a first asset as compared to the current holdings of the ETF, and wherein the adjusting comprises increasing the first asset in the creation basket.

12. The method of claim 10, wherein the target set of assets includes less of a first asset as compared to the current holdings of the ETF, and wherein the adjusting comprises at least one of decreasing the first asset in the creation basket and increasing the first asset in the redemption basket.

13. The method of any one of claims 1-3, wherein the redemption basket is selected to avoid a wash sale of a particular asset held by the ETF, wherein the wash sale would increase tax liability for the ETF.

14. The method of any one of claims 1-3, wherein the redemption basket is selected to exclude a particular security that had been sold from the ETF via the creation basket for a period of time after the sale, and wherein the particular security is included it in the redemption basket.

15. The method of any one of claims 1-3, wherein the creation and redemption baskets are selected to increase the holdings in the ETF of securities eligible for a more favorable tax rate.

16. The method of claim 15, wherein the more favorable tax rate is a qualified dividend income tax rate.

17. The method of any one of claims 1-3, wherein the ETF includes an inaccessible security, and wherein the creation basket includes a substitute security in place of the inaccessible security.

18. The method of any one of claims 1-3, wherein a particular security is subject to a position limit, and wherein the particular security is contained in the redemption basket but replaced with a substitute security in the creation basket.

19. The method of any one of claims 1-3, wherein the ETF is subject to a diversification rule, and wherein a set of securities is excluded from the creation basket but included in the redemption basket, wherein keeping the set of securities in the creation basket would violate the diversification rule.

20. The method of any one of claims 1-3, wherein a particular security in the ETF is associated with a corporate action or a proxy vote, and wherein the particular security is excluded from the redemption basket and included in the creation basket.

21. The method of any one of claims 1-3, wherein an odd-lot for a particular security is excluded from at least one of the creation basket and the redemption basket, and substituted with a substitute security or asset in round-lot form.

* * * * *